United States Patent Office 3,533,828
Patented Oct. 13, 1970

3,533,828
METAL PLATING OF PLASTIC SURFACES
Richard Duwayne Rowe, Big Spring, Tex., assignor to Cosden Oil & Chemical Company, Big Spring, Tex., a corporation of Delaware
No Drawing. Continuation-in-part of applications Ser. No. 654,066, July 18, 1967, and Ser. No. 677,863, Oct. 25, 1967. This application Apr. 8, 1968, Ser. No. 726,270
Int. Cl. B44d 1/092; C23c 3/02
U.S. Cl. 117—47   27 Claims

ABSTRACT OF THE DISCLOSURE

Plastic surfaces of an object are treated to accept a firmly adherent metal plating by exposing the surfaces to a controlled quantity of a solvent for the plastic. The plastic surfaces can then be further treated by oxidation with a solution of sulfuric acid substantially saturated with hexavalent chromium ions and then sensitized by a esterified ethoxylated hydrophobe. The oxidized surfaces can next be activated by any suitable method such as, for example, contact with a colloidal noble metal. Next, the activated surfaces can be accelerated and electrolessly plated with a metal in a convenient manner.

This application is a continuation-in-part of my copending application, Ser. No. 654,066, filed July 18, 1967 and of Ser. No. 677,863 filed Oct. 25, 1967, both now abandoned.

The present invention relates to plating of plastic surfaces and involves several aspects. An important one of these aspects is a pretreatment step in which the surface of a polystyrene material is treated in such a manner that it can be subsequently plated. This pretreatment step makes it possible for the first time to effectively and adherently plate polystyrene and polystyrene impact polymers. Other aspects of the present invention involve various steps, subsequent to the pretreatment step, utilizing novel procedures and treating solutions, which provide significant improvement for plastic plating processes in general, as well as having specific utility in the plating of polystyrene material which has been pretreated in accordance with the first mentioned aspect of the present invention. Such other aspects include novel procedures and solutions for performing an oxidizing step and a sensitizing step in the course of plating a plastic article.

Polystyrene and modification products as the term is used herein includes the hard, molded plastic pure polystyrene homopolymer, its impact products formed by dissolving or dispersing about 1 to 20% of preformed rubber particles in the styrene monomer before polymerizing; copolymers of styrene with acryonitrile containing at least 40% of styrene, a product know as San, and which copolymer may also contain 1 to 20% of preformed rubber particles, such impact being known as ABS, in which a styrene is present in the approximate range of 40 to 67%, and the remainder is acrylonitrile and rubber. It will be understood that the molded plastic to be preconditioned and coated with metal as described herein, may include any of such above-mentioned modification products.

Polystyrene and modification products are generally nonconductive and substantially inert to normal treatments for surface conditioning of plastics to accept reduced and/or electroless platings which thereafter can have electroplated metallic coatings thereon. Such coatings as have been applied have had low adhesion, requiring little pull to peel a metallic film one inch wide therefrom. Consequently, efforts in the art have been largely to precoat the molded plastic surface with adhesive films which sometimes are impregnated with conductive substances and the metal plating is applied to such intermediate adhesive film. In either case, such films usually do not form a suitable base for smooth metallic coatings. While a limited degree of success has been achieved in the past when acrylonitrile in significant quantity was involved as a copolymer component of the modification product to be metal coated, the results of prior plating efforts were extremely poor when the material on which plating was attempted was polystyrene homopolymer or impact polystyrene, the latter being a modification product in which about 1% to 20%, typically around 5%, of a diene elastomer (e.g., polybutadiene, styrene-butadiene rubber, and like elastomers) is incorporated, e.g., by polymerizing styrene monomer that first has had the elastomer dissolved in it or carried in it as a latex in emulsion polymerization or otherwise incorporated therein.

According to one embodiment of this invention, the surface of the polystyrene material is contacted in a controlled manner with a solvent, which is retained, as by absorption, in surface regions of the polystyrene material. As will be explained in detail in the present application, such pretreatment may be conducted by contacting the polystyrene material in at least three different ways: (1) by contact with a system involving a solution which carries a polystyrene solvent in a controlled manner; (2) by contact with a system in which the polystyrene solvent is carried in a gaseous phase, preferably in the presence of inert carrier gas; and (3) as a prefered embodiment, by contact with a system involving a polystyrene solvent wherein the solvent is not present in true solution, but is dispersed as an emulsion. In the latter and preferred system, typically, the polystyrene solvent is carried in water, in the presence of a surface active agent. The preliminary pretreatment step, in which the polystyrene material is treated with a solvent, is followed by subsequent treating steps to complete preparations for plating. The subsequent steps referred to following the novel pretreatment step may conform generally to certain prior art steps which have in the past been applied to preparing certain other plastic materials for plating. But alternatively, and preferably, certain of these steps are conducted in accordance with further embodiments of this present invention.

According to another embodiment of this invention, a novel oxidizing step is provided in which a pretreated polystyrene article is subsequently treated in a solution of saturated hexavalent chromic ion in sulfuric acid.

According to still a further embodiment of this invention, a succeeding sensitizing step is provided in which a specific and novel sensitizing fluid containing an esterified polyethoxylated compound is involved.

When utilizing this invention, a noble metal as a catalyst may subsequently be applied to the polystyrene material being treated, as from a colloidal suspension of noble metal, and thereafter electroless plating may be used to selectively plate the polystyrene material without electrolessly plating the rack utilized to move the polystyrene material through the sequential steps of processing. Moreover, the novel oxidizing step and solution and sensitizing step and solution have certain definite other advantages over prior art procedures, as will be explained more fully at a later point herein.

Turning now to a detailed discussion of the important pretreatment step or aspect of the present invention, it has been found that treatment of the smooth molded polyvinyl aromatics and copolymers thereof (such as with acrylonitrile, typically polystyrene or copolymers of styrene and acrylonitrile) with a small quantity of solvent for the polymer, the solvent being maintained in a dilute state in a fluid carrier which is a nonsolvent for the polymer, allows retention of the solvent such as by trace absorption of the solvent into the smooth surface of the plastic, thereby modifying and conditioning the polystyrene or polystyrene-acrylonitrile surface to accept a firmly-adherent metal plating thereon. The plastic to be plated, such as polystyrene with or without rubber or copolymer of polystyrene with acrylonitrile, sometimes further including rubber to improve its impact strength, is sometimes hereinafter referred to as polystyrene.

The solvent for the polystyrene may be carried (1) in solution; (2) as a dispersion in a liquid medium; or (3) by a vapor or gas. Each of these three approaches will be discussed later herein, but first discussion is directed to the nature of the solvent for the polystyrene.

The polystyrene surface-modifying solvent generally has nonpolar characteristics, however, it is within the scope of this invention for said solvent to have polar characteristics. For liquid phase treatment it is either normally a liquid at ambient temperatures, or may be condensed to liquid form at moderately low temperatures, e.g., on the order of −10° C. or higher, and acts like a liquid when dissolved in the carrier fluid in the stated concentrations. For vapor phase treatment the solvent is either normally gaseous or is vaporizable at any practical treating temperatures up to the stability limit of the polystyrene, such as about 200° F., at moderate pressures from 0.1 to 100 p.s.i.g., and preferably for liquid phase treatment the solvent is a liquid at ambient temperatures; and for vapor phase treatment it may be a gas at temperatures up to 212° F.

Of the numerous solvents for polystyrene useful herein, are the more common aromatic hydrocarbons, e.g., those usually having 6 to 24 carbon atoms such as benzene, toluene, ethylbenzene, o-, m-, or p-xylenes, diethylbenzenes, divinylbenzenes, trimethylbenzenes, triethylbenzenes, ethyl styrene, tetra-methylbenzene, tetraethylbenzene, styrene monomer, alpha-methyl-styrene, vinyl toluene as well as other liquid aromatics saturated and unsaturated in the side chain. Although as stated, the solvent is generally nonpolar, the solvent may be predominantly composed of nonpolar groups such as aromatic hydrocarbon groups which can be substituted with some polar type radicals insufficient in quantity, type, or distribution to destroy the solvent characteristic for the polystyrene. Such polar groups may be amine, hydrazino, oximino, sulfur containing groups (e.g., sulfide, sulfo, sulfone, etc.), nitrile, alkoxy or halo, such as chlorine, fluorine, bromine or iodine, typical examples being aniline, methylaniline, phenylhydrazine, methyl pyrolidone, anisidine, p-chloro toluene, cyano benzene, p-ethoxy toluene. Saturated alkanes and alkenes, typically $C_5$–$C_{15}$ alkanes and alkenes may be also be used, such as the pentanes, octanes, decanes and corresponding $C_4$–$C_{18}$ alkenes such as butenes, pentenes, isoprenes, heptenes and decenes; alicyclic including terpenes having 5 to 24 carbon atoms such as cyclopentane, cyclohexane, methyl cyclohexane, cyclopentene, cyclohexene, methylcyclohexene, cyclopentadiene, dicyclopentadiene, dipentene, bornylene, alpha-pinene, p-methene, camphene, alpha-terpinene, butylcyclohexane, diethylcyclohexane; and halogenated hydrocarbons having 1 to 12 carbon atoms, preferably chlorinated hydrocarbons as well as mixed chlorinated-fluorinated hydrocarbons, typically chloroform, carbon tetrachloride, perchloroethylene, chlorobenzene, chlorinated toluene, fluorinated hydrocarbons (e.g., trichloromonofluoromethane, dichlorodifluoromethane, monochlorotrifluoromethane, etc.) and the like.

In addition to the pure hydrocarbon and halogenated hydrocarbon, commercial non-polar polystyrene solvent mixtures such as petroleum ethers, i.e., $C_4$–$C_{10}$ naphthas, mixed aromatic $C_6$–$C_9$ distillates, terpene oils, mixed xylenes, mixtures of benzene and toluene and halogenated lower $C_1$–$C_3$ hydrocarbon mixtures including mixed commercial carbon tetrachloride, chloroform, methylene dichloride and fluoroethylenes, and mixed chloro-fluoro methylenes, ethylenes and propylenes per se are useful polystyrene solvents herein.

It should be noted that when the polystyrene is an impact material having a diene elastomer incorporated therein, best results are obtained when the solvent is a solvent for the elastomer as well as for polystyrene per se. The above described solvents in general meet this criteria.

The pretreatment step, by which the polystyrene material is treated with a solvent, may be a liquid phase treatment in which the polystyrene to be plating-conditioned is wet, such as by spraying or immersing the plastic in a dilute liquid solution or carrier of the solvent for the plastic in a liquid carrier fluid which can contain water and a water-miscible organic liquid in which the polystyrene is insoluble. The water in such solution can be used as a control of excessive solubility to reduce the solubility of the polystyrene solvent in the carrier liquid so that, in the quantity in which the polystyrene solvent is present, from 0.25 to 25%, more usually 1 to 15% by volume, the solubility of the polystyrene solvent is limited in the organic liquid carrier, but is still clearly soluble therein. Such a polystyrene treating solution for liquid phase treatment is a clear, homogeneous solution, consisting of a ternary system of (a) water-insoluble polystyrene solvent, (b) water-miscible polystyrene nonsolvent in which the polystyrene solvent is soluble in the quantity used, and (c) water sufficient to reduce the solubility of the polystyrene solvent in the carrier liquid, but not beyond its saturation therein.

The organic carrier liquid is a substantial nonsolvent for the polystyrene. The organic component is most usually a polar liquid and may be nonsolvent for the polystyrene per se without any water. When the organic polar liquid has some solubility for the polystyrene, then water may be added to entirely inhibit the polystyrene solubility therein. The added water in the solution of polystyrene solvent in the carrier liquid, as stated, also assists in controlling the desired rate of solvent retention by the polystyrene surfaces exposed thereto.

Certain more common commercial solvents, such as isopropanol, ethanol and acetone are not only improved for these reasons as carrier liquids by a substantial water content, but such commercial organic solvents are far more economically available with substantial water contents. Consequently, it is convenient and desirable, but not essential, that the carrier liquid be water soluble.

Typically useful polystyrene nonsolvent liquids are water-soluble lower aliphatic alcohols and ketones which are generally non-volatile at the treating temperatures. For this purpose I may use lower monohydric alkanols such as methanol, ethanol, propanol and isopropanol, n-butanol, t-butanol; polyhydric alkanols having 2 to 6 carbon atoms such as ethylene glycol, propylene glycol, butylene glycol and glycol ethers such as diethylene glycol and dipropylene glycol; lower aliphatic ketones such as acetone, diethyl ketone and methylethylketone; and other solvents such as dimethyl formamide, dimethyl sulfoxide and diethyl sulfoxide. In general the quantity of hydrocarbon in the solution with polar liquid is adjusted in the range stated and the time of exposure of the molded polystyrene product is adjusted to allow absorption from the solution so that the surface of the polystyrene absorbs .01 to 3.0, preferably about 0.05 to 0.5 gram per square foot of plastic surface in an immersion time of as little as 15 seconds, but usually on the order of 1 to 10 minutes, the time and the quantity being determined upon the differences in weights of the polymer before and after treatment with the nonpolar solvent and drying.

The temperature, as stated, in either case is regulated to be below the polystyrene softening point; that is, below about 200° F., and the time of exposure, too, is also a useful regulation to control the extent of solvent absorption particularly in the vapor phase contact. In general, a good solvent such as an aromatic or terpene hydrocarbon solvent may have the plastic exposed to its dilute vapors at temperatures up to 212° F., usually 70 to 200° F., for a period of 15 seconds to a noncritical longer period such as thirty minutes, usually from 1 to 10 minutes being adequate to impart substantially adhered metal coating characteristics to the molded polystyrene.

In an alternate, and preferred, liquid phase pretreatment step, the organic polystyrene nonsolvent may either be omitted or used in quantity insufficient to completely dissolve the polystyrene solvent, and the polystyrene solvent is then suspended, carried as an emulsion therewith, or otherwise dispersed in water further including, if desired, some organic polystyrene nonsolvent. For this purpose, a surface-active agent is added to the immiscible mixture of water and polystyrene solvent in any order. The polystyrene solvent may become very finely dispersed in the aqueous phase with usual homogenization or agitation in varying degrees of dispersion, variable with the specific components.

A desirable and preferred form of surface-active compound which may be used for suspending the polystyrene solvent in water or solution of water in a polystyrene nonsolvent is an ethoxylated compound that is miscible in the polystyrene solvent and miscible in water. Such surface-active agent allows heavier loading in stable form of the surface of the polystyrene with solvent while avoiding blistering or surface deformation of the plastic, and comprises typically a polyethyleneoxy compound having a hydrophobic portion of the molecule and a hydrophilic portion containing ethylene oxide. Examples of ethoxylated compounds suitable for use are the water miscible ethoxylated: octyl phenols, nonyl phenols, polyoxypropylenes, fatty acids, fatty alcohols, fatty amines, fatty diamines, and fatty amides; and the salts, ethers, organic and inorganic esters, halogenated products, and sulfonates of the ethoxylated compounds are also exemplary of such materials. Many suitable ethoxylated compounds have the general formula R–X(OCH$_2$CH$_2$)nOH. The hydrophobic portion of the molecule R is hydrocarbon, such as an alkyl, typically hexyl, actyl, nonyl, decyl, hexadecyl, having from 6 to 24 carbon atoms, or an alkyl aryl compound in which the alkyl ranges from about 6 to 24 carbon atoms, the latter preferably having 1 to 3 alkyl substituents on a benzene ring; alkyl substituents being typically, diisopropyl, diisobutyl, nonyl, independent di-alkyls such as two isooctyl radicals, two nonyl radicals, one n-decyl radical and combinations thereof with one or two methyl or ethyl groups on the ring, thus forming a mono, di or tri-alkyl benzene radical of which the longest single alkyl chain thereon is at least a six carbon atom alkyl such as diisopropyl. In the above formula. X may be omitted, or it may be a member of the group consisting of —O—, —S—,

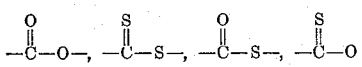

(CH$_2$CH$_2$O) is an ethyleneoxy group; and $n$ is a whole number ranging from about 5- to 60, preferably from about 11 to 30. The salts, ethers, polyether alcohols, organic and inorganic esters, halogenated products, and sulfonates of the ethoxylated compounds denoted by the above formula may also be used. The surface-active compound is used in any small, noncritical quantity, usually on the order of 1% by volume or more.

Examples of suitable ethoxylated surface active agents include typically octyl and nonyl phenoxy (ethyleneoxy) ethanol with 13 and 16 moles of ethylene oxide per mole of hydrophobe; N,N polyoxyethylene N tallow, 1, 3, diamino propane containing an average of 15 moles of ethylene oxide per mole of hydrophobe; polyethoxylated (20 moles) oleyl amine; polyethoxylated (18 moles) stearic acid; polyethoxylated (22 moles) hydrogenated tallow amide; the ethoxylated polyoxypropylene having a number average molecular weight of approximately 2900 grams/mole and an ethylene oxide content of 40 weight percent; polyethoxylated (16 moles) myristyl alcohol; polyethoxylated (25 moles) hexadecyl phenol; ethoxylated (10 moles) p-phenol sulfonic acid; nonyl phenoxy vinyl ether containing 12 moles of ethylene oxide, and mixtures thereof.

It should be understood that various of the foregoing polyethoxylated agents fall in different classifications as to the nature of their activity, some being nonionic, some being cationic, and some being anionic.

When the preferred ethoxylated type surfactants, as described above are utilized, it is found that enhanced results may be obtained when the water-solvent system maintained by the ethoxylated material have added to it a sufficient quantity of alkali metal hydroxide, for example, sodium or potassium hydroxide, to cause the dispersion to appear substantially clear. At this point, the dispersion is quite alkaline, with a pH running preferably in excess of 11.

Nonpolyethoxylated surface-active agents may be used in certain instances, although they are not preferred. Such agents that may be used include alkali metal soaps of higher fatty acids, typically sodium stearate, alkali or ammonium soaps of sulfonic acids typically sodium lauryl sulfate, sodium dodecyl benzene sulfonate, higher alkyl dilower alkyl benzyl ammonium salts of a mineral acid such as cetyl dimethyl benzyl ammonium chloride.

It should be noted that it is sometimes desirable to use a mixture of the polyethoxylated agents with the nonpolyethoxylated agents for purposes of stabilizing the dispersions.

A distinct advantage of the preferred pretreatment procedure is that it has a relatively high flash point, and thus presents little fire and explosion hazard.

As yet another alternate pretreatment, the polystrene surface may be pretreated to plating-condition by exposing it to a gas or vapor which carries polystyrene solvent. In general, the polystyrene solvent is maintained in a desirably diluted state, within the previously stated quantity range. The solvent may be carried by a carrier gas in which polystyrene is insoluble. While such gas can contain water vapor, it is not essential that water vapor be present, nor is the character of the carrier gas critical. If desired, the treatment in gaseous or vapor phase may be accomplished by first preparing a fluid medium containing a polystyrene solvent dissolved or dispersed in a nonsoluble and/or water medium within the said quantity range. Thereafter, the liquid phase medium may be changed to the vaporous or gaseous state, as by heating, and the resulting gaseous or vaporous mixture is caused to contact the polystyrene surface.

Regardless which of the alternative pretreatment procedures is used, and whether the surface of the polystyrene material is wet by the liquid medium in which the polystyrene solvent is contained by solution or dispersion, or merely contacted with a vaporous medium in which the solvent is present in the vapor state, the dilution of the solvent in the medium to which the molded polystyrene is exposed serves to control the very small amount needed to be absorbed in the plastic surface, thereby conditioning the molded surface to accept a strongly adhered metal coating. Whichever of the alternative pretreatment procedures is used, the contact preferably occurs at a treating fluid temp. range of about 70° F. to about 200° F., and with the polystyrene solvent in a concentration range of 0.25 to 25% by volume of the total treating fluid.

Following the exposure of the plastic for pretreatment of its surface preparatory to further metal coating, either by homogeneous solution or dispersion or solvent vapor as described above, the treated molded polystyrene product may be empirically washed or dried and will be observed to have no noticeable change in empirical appearance.

Following the pretreatment of the plastic surface with a controlled amount of solvent applied by any one of the several methods described, the empirically rinsed or dried surface is then etched in a second step by an oxidizing solution comprising hexavalent chromium in strong sulfuric acid in water. Such oxidizing etch is known in the art for plastics generally when applied as a concentrated sulfuric acid solution. It usually contains hexavalent chromium in low content, less than about 1% by weight calculated as hexavalent chromium, it has a density of at least 1.67 grams per cc. and usually higher, and it is not usually saturated in hexavalent chromium ion. The molded polystyrene product is dipped in such acid oxidizing solution for several minutes, following the prior art practice for this and other plastics needing an oxidizing etch, and is then washed to remove the acid oxidizing solution. The plastic may then be treated in a sensitizing step, which will be explained in more detail at a later point herein.

While the etch procedure (sometimes called herein the "oxidizing" or "oxidation" step) referred to above may be used, there are many disadvantages in this particular acid etch solution which, in another aspect of this invention, applicant here markedly improves. For instance, the very strong and highly hygroscopic concentrated sulfuric acid involved in the prior art practice tends to absorb large quantities of water from the air in use over a relatively short period of open air exposure and becomes diluted and thereby reduced in the critical gravity. Consequently, in relatively short sequential periods, the gravity of the solution must be adjusted by adding more concentrated acid as well as hexavalent chromium to maintain the density heretofore considered to be critically essential.

It has now been found, according to this aspect of the invention, that superior results are obtained if the old acid solution is replaced by one in which hexavalent chromium ion is in a substantially saturated condition with respect to the acid solution, and in which the total hexavalent chromium content of a freshly prepared solution prior to use is at a critical minimum of about 1¼% by weight, calculated as hexavalent chromium. For the purpose of mixing such an acid solution, a moderately strong sulfuric acid solution having a comparatively low gravity of acid, e.g., of a density of about 1.1 to 1.5 grams per cc. (before addition of the chromium), may be used. Such acid has added thereto hexavalent chromium, as by addition of potassium dichromate or chromium trioxide, and the solution is concentrated in hexavalent chromium, usually by heating to evaporate water until some of the chromium precipitates from the solution, indicating full saturation at the evaporating temperature of hexavalent chromium, or by addition of acid or hexavalent chromium in quantity sufficient to obtain saturation with hexavalent chromium. When chromium trioxide is observed to precipitate, the solution may be slightly diluted with a minor amount of water, up to about 5% by weight, which is usually merely sufficient to bring the precipitated hexavalent chromium compound back into a clear acid solution saturated with hexavalent chromium. Hence the solution remains substantially saturated in hexavalent chromium ion. In that state, even though the density of the sulfuric acid is well below the maximum normally used, for instance seldom more than about 1.55, the hexavalent chromium therein is in a substantially saturated condition. The sulfuric acid limit of concentration is not critical and may be as low as 1.01 grams per ml. since by water evaporation at the operating temperature (e.g. about 175° F.) the acid solution is brought up to a substantially higher concentration, such as about 1.55, or other desired value.

In the novel solution described, it is pointed out that the hexavalent chromium content at saturation may vary from about 1¼% by weight to about 32% by weight of hexavalent chromium (calculated as hexavalent chromium) in a freshly prepared oxidizing solution. In such a solution, the preferred hexavalent chromium content at saturation ranges from about 7% to about 16% by weight.

With the novel oxidizing solution described, the great expense of maintaining the acid solution at extremely high gravity, as usually practiced in the art, by maintaining extremely high sulfuric acid concentration and often adjusting the gravity at short intervals, is eliminated. The new acid solution, saturated in hexavalent chromium, does not absorb water, but instead water occasionally must be added to replace that lost to evaporation at operating temperature.

A distinct advantage of the new oxidizing solution is that the end plated product obtained from subsequent steps has a metal plating more firmly adhered to the surface of the plastic article being plated.

Another and important advantage is that use of this novel etch, followed by the novel sensitizing step described hereinafter and by an activation step involving noble metal catalysts from colloidal solution, makes it possible to most effectively selectively plate polystyrene articles without plating the rack that carries them. Thus, rack plating is avoided, and expensive rerack procedure may be avoided.

While the pretreatment step as described above is critically useful for the plating of polystyrene homopolymer high impact products involving styrene and rubber as raw materials, the acid etch solution here described is useful for various other plastics; for instance, polyethylene, polypropylene, polyvinyl chloride, polysulfones, and other common metal platable plastics as well as the modified styrene hereof such as crystal styrene, rubber-modified styrene and copolymers of styrene and acrylonitrile with or without further modification with rubber. The method, moreover, it may be pointed out, is consistent with the overall principal of this invention that extremely firm metal adhesion results, highly resistant to peeling, when this type of acid etch is used.

In another aspect of this invention as at the third step, following treatment with the acid etch and washing, it is found that the further treatment in a small quantity of an aqueous solution of any one or more of the above identified ethoxylated compounds which have been esterified with a strong lower organic or a multivalent mineral acid such as monochloroacetic, methyl acrylate, oxalic, formic, phthalic, tartaric and citric, typical of organic acid components or phosphoric and sulfuric typical of multivalent mineral acid components, the ester imparts a sensitizing, catalytic-receptive effect to the surface for further treatment. The phosphoric mono- and di-esters of the ethoxylated hydrophobes are preferred.

By such treatment of the plastic surface it is sensitized to be receptive to coating with a noble metal, preferably in active colloidal form according to the next step.

Esterified compounds with one or two remaining free replaceable hydrogen atoms can be neutralized with alkali such as sodium hydroxide or ammonia to form a mono- or di-alkali or ammonium salt such as mono or di-sodium phosphate ester and the resulting compounds can be used to make a sensitizing solution.

As a sensitizer, phosphoric or sulfuric ester compounds and mixtures thereof which have been converted to phosphate esters or sulfate esters may be used such as the phosphate mono ester of an octyl or nonyl phenoxypoly (ethyleneoxy) ethanols containing an average of about 25 moles of ethylene oxide per mole of hydrophobe (a commercially available example being Rohm and Haas XQS–7), and the sulfuric acid ester or octyl or nonyl-phenoxypoly (ethyleneoxy) ethanols having 35 moles of ethylene oxide per mole of hydrophobe.

The sensitizer is used in water solution in a wide range of concentrations, ranging from about .001 to 15% by weight.

For typical rack inhibiting, the sensitizer compound of approximately 50% by weight mono ester and 50% by weight diester prepared by reacting nonylphenoxy-polyethyleneoxy ethanols containing an average of 9 moles of ethylene oxide per mole of hydrophobe with polyphosphoric acid is preferred and may be used in the range of about 0.04 to about 0.2% by weight. This particular compound is a preferred embodiment and has yielded best results to date in inhibiting such plating. A commercially available example of such material is Gafac RE610 (General Aniline and Film Corporation).

Following the treatment of the plastic with the oxidizer solution it may be dipped in a stannous chloride solution dissolved in hydrochloric acid followed after washing with water, and then treated by dipping in a dilute salt solution of a noble metal such as platinum, palladium, gold or rhodium salts. Usually such chloride is dissolved in hydrochloric acid at a low pH such as below about 2.5, and usually in the range of 1.1 to 2.5 for several minutes. It has been found, however, as another aspect of the present invention, that where the plastic following the oxidizing etch has then been treated with an ester of a polyethyleneoxy compound, as defined above, the plastic becomes sensitized to accept the noble metal activator directly from a colloidal mixture or suspension, as explained in U.S. Pat. 3,011,920, issued Dec. 5, 1961, to Charles R. Shipley, Jr. The noble metal in colloidal admixture with the tin salt becomes reduced to a colloidal noble metal form, firmly adherent to the etched and then polyethoxy ester sensitized pretreated plastic body, whereby a strong electroless metal coating will firmly plate directly thereto.

Moreover, as preferred herein a saturated hexavalent chromium acid etch step has been previously conducted whereby great firmness is available in adherency of the plate to the sensitized plastic.

Furthermore, when, after an oxidizing step conducted with the novel saturated hexavalent chromium ion acid etch solution, a specific sensitizer comprising in quantity about 0.04 to about 0.2% by weight of the above described solution of phosphoric acid mono and di esters of nonyl phenoxypoly (ethyleneoxy) ethanols, e.g., Gafac RE610. The mono- or di-esters may be used individually or in combination, but it is preferred that they be used together in relative quantity in the range of 4:1 to 1:4 by weight.

For final procedure to complete the plating, the washed noble metal coated plastic is preferably given an accelerator treatment which, as known in the art (see U.S. Pat. 3,011,920 to Shipley), is an oxidizing agent such as perchloric acid or palladium chloride which is then washed from the plastic surface with water. The thus treated plastic is now ready for an electroless plate; for instance, by giving it a nickel coating in an acid nickel hypophosphite bath at moderately raised temperature such as 140 to 160° F., or in an alkaline bath at about 60 to 90° F. Such electroless bath follows the procedures as known in the art and comprises typically 20 volume percent admixture of Macuplex nickel concentrate and 4 volume percent of Macuplex nickel reducer concentrate in 76 volume percent of water, the pH being adjusted to 4.8 to 5.

The following examples further illustrate the practice of this invention:

PRETREATMENT WITH LIQUID SOLUTIONS

EXAMPLE I

Electroless

A 2 inch by 4½ inch color chip of rubber-modified polystyrene was treated in a solution of 600 parts isopropyl alcohol, 99%, 75 parts toluene and 250 parts water for one minute at 73° F. The chip was air dried and the surface inspected for solvent effects. Little or no surface change was noted. The color chip was then immersed in a 60 Baumé solution of 40 g./l. potassium dichromate in sulfuric acid and water at 135° F. for three minutes. (The chip is rinsed between each step of the process in tap water to avoid contamination of subsequent treating baths.) The chip was next treated in an aqueous solution containing 15 g./l. stannous chloride and 8 ml./l. of concentrated hydrochloric acid at 73° F. for 30 seconds. The chip was placed in a dilute palladium chloride solution at 130° F. and pH of 1.6 to 1.9 for three minutes. The dilute palladium chloride solution was prepared from 45 parts of a MacDermid Macuplex ABS activator concentrate diluted to 900 ml. total volume with water. Alternatively, the palladium chloride solution may be prepared by addition of approximately one gram of palladium chloride per gallon of water, maintaining pH at about 1.5 by the addition of hydrochloric acid. The part is then placed in a dilute aqueous solution of an organic reducing agent, such as MacDermid's Macuplex ABS accelerator, at 73° F. Alternatively, the aqueous accelerator solution may be prepared with 10 grams of sodium borohydride per liter of water. A chemical nickel plate is reduced onto the surface from a hypophosphite-nickel electroless bath at 150° F.

The bath was prepared as follows: 20% volume of Macuplex nickel concentrate and 4% volume of Macuplex nickel reducer concentrate were added to 76% volume water, and the pH was adjusted to 4.8 to 5.0. Alternatively, a satisfactory bath may be prepared as follows: 30 grams per liter of nickel chloride, 50 grams per liter of sodium glycollate, and 10 grams per liter of hypophosphate maintained at a pH of 4.2 and a temperature of 180° F.

After electroless plating the chip was given a nickel strike and a copper plate of sufficient thickness for a plate adhesion test. The chip was aged for one hour at 80° C., prior to testing the plate adhesion. Adhesion was 6 to 8¼ pound per linear inch.

EXAMPLE II

A color chip of rubber-modified polystyrene was treated for two minutes in a solution of 60 parts of toluene, 250 parts of water and 600 parts of isopropyl alcohol at 75° F. The part was air dried and processed as in Example I. Adhesion was found to be 7 pounds per linear inch.

EXAMPLE III

A rubber-modified polystyrene color chip was treated with a solution of 75 parts toluene, 300 parts of dimethyl formamide, 300 parts of isopropyl alcohol and 250 parts of water. The chip was air dried and processed as in Example I except that instead of aging for one hour at 80° C., the chip was allowed to remain at ambient temperature for 20 minutes prior to testing of the plate adhesion. Adhesion was found to be 4.5 to 6.5 pounds per linear linch.

EXAMPLE IV

A color chip of rubber-modified polystyrene was treated with a solution of 100 parts of methylene chloride, 600 parts of isopropyl alcohol and 250 ml. of water for two minutes and air dried. The chip was processed as in Example I. Plate adhesion was found to be 3 to 3½ pounds per linear inch.

EXAMPLE V

A color chip of rubber-modified polystyrene was treated with a solution of 75 parts of xylene, 600 parts of isopropyl alcohol and 250 parts of water for one minute and then air dried. The chip was processed as in Example I. Plate adhesion was found to be 8.5 pounds per linear inch.

EXAMPLE VI

A color chip of rubber-modified polystyrene was treated with a solution of 75 parts of xylene, 500 parts of isopropyl alcohol and 250 parts of water for one minute and air dried. The part was processed as in Example I. Plate adhesion was 6.5 pounds per linear inch.

EXAMPLE VII

In contrast to Example I, a knob was dipped in pure, undiluted toluene for one minute. It was then withdrawn and dried of the excess solvent. It was then sent through the same procedure as in Example I, for coating. The electroless plate did not cover the entire surface of the knob and the adhesion was very low, being estimated to be less than one-half pound per linear inch.

EXAMPLE VIII

A molded knob of polystyrene resin was treated in a solution of 80 ml. of isooctane, 600 ml. of isopropyl alcohol and 250 ml. of water for 25 minutes at 90° F.

The knob was preplated and electroplated as in Example I. The appearance of the knob was considered acceptable and adhesion was estimated to be more than three pounds pull for an inch wide strip of plate.

EXAMPLE IX

With vapor

A polystyrene knob was supported in a chamber through which a mixture of air saturated with toluene vapor was circulated for ten minutes at a temperature of 90° F. Preplate coverage was complete with adhesion estimated to be at least thre pounds per inch.

PRETREATMENT WITH EMULSION

EXAMPLE X

A polystyrene resin knob was immersed for one minute in a dispersion of toluene in water prepared by mixing 75 ml. of toluene with 50 ml. of an alkyl phenoxy polyethoxy ethanol (Triton X102, Rohm & Haas) and diluting the 1000 ml. with water while stirring. The knob was then rinsed and treated for three minutes with a 60 Baumé solution of sulfuric acid saturated with $K_2CR_2O_7$ at 140° F. After rinsing, the part was immersed for 5 minutes in a 50 weight p.p.m. water solution of the phosphate mono ester of octylphenoxyloyl (ethyleneoxy) ethanols containing an average of about 25 moles of ethylene oxide per mole of hydrophobe at a concentration of 50 p.p.m. in water. The part was then treated with a colloidal palladium catalyst at 90° F. for five minutes prepared as in U.S. Pat. 3,011, 920, to Shipley, accelerated with a dilute solution of perchloric acid at 90° F. and electroless plated in a nickel-hypophosphite system at pH 9 and 90° F. The knob was given a nickel strike, a bright copper plate 2/1000 inch thick and a bright nickel plate 0.3/1000 inch think. The plate adherent to the plastic surface an estimated 5 to 8 pounds pull per linear inch.

EXAMPLE XI

A solution of 60 ml. of Igepal CO-630, a nonylphenoxypolyethyleneoxy ethanol containing 9 moles of ethylene oxide per mole of hydrophobe (General Analine & Film Corporation) and 40 ml. of toluene was prepared and a 5% dispersion in water prepared. The dispersion was heated to 130° F. and polyoxyethylene (15) tallow triethylene diamine (Armour Ethoduomeen T/25) added until the dispersion became clear. A rubber-modified color chip was immersed in the dispersion for 10 minutes at 130° F. and rinsed. The color chip was preplated by the following cycle:

| | Time/min. |
|---|---|
| 60 Bé. chromium saturated sulfuric acid at 145° F. | 3 |
| 50 p.p.m. at Rohn & Haas XQS-7 phosphate ester detergent (as previously described herein) | 5 |
| Colloidal palladium catalyst (U.S. 3,011,920) 90° F. | 3 |
| Prechloric acid solution at 90° F. | 0.5 |
| Electroless nickel, 90° F. | 7 |

The color chip was copper plated and tested for adhesion. The plate was adherent to the plastic surface at 6 to 8 pounds per linear inch.

EXAMPLE XII 100 ml. toluene and 150 ml. of an ethoxylated octyl phenol containing 12 to 13 moles of ethylene oxide per mole of hydrophobe were blended together and water added to a total volume of 1000 ml. with stirring. The resultant solution was quite transparent, with only a slight haze. A rubber-modified polystyrene knob (high impact polystyrene knob made by polymerizing styrene with about 5% polybutadiene dissolved therein) was treated in the solution at 73° F. 2 mins. and rinsed in 120° F. water for 5 minutes. The knob was immersed 10 minutes in a sulfuric acid-water solution containing hexavalent chromium compounds (as chromium trioxide) at saturation, the solution having a density of 46.2° Baumé at 175° F. for 10 minutes. Next, the knob was sensitized in an aqueous solution containing 50 p.p.m. phosphate ester (commercially available as Rohm & Haas XQS-7) and 2 weight percent of General Aniline and Firm Corporation Gafac RE610, described previously herein, by dipping in the solution maintained at 73° F. for 3 minutes. The part was then activated in a colloidal palladium catalyst at 90° F. for 3 minutes as prepared in U.S. Pat. 3,011,920 to C. R. Shipley, Jr. The knob was then accelerated in a dilute perchloric acid solution at 90° F. for 3 minutes (see said Shipley patent) and nickel plated in an ammoniacal nickel electroless bath at 90° F. for 7 minutes. The knob was electroplated and given a cursory examination for plate adhesion. The plate adhesion was estimated to be in excess of three pounds pull per inch after ten minutes in an over at 180° F.

EXAMPLE XIII

One liter pretreatment dispersion in water was prepared containing 100 ml. of an ethoxylated octyl phenol containing 12 to 13 moles of ethylene oxide per mole of hydrophobe and 50 ml. of oil of turpentine was prepared. The resultant dispersion was opaque and milky. A rubber-modified polystyrene knob was treated in the solution for four minutes at 95° F., rinsed for 4 minutes in 120° F. water and plated by the cycle described in Example XII. Adhesion was estimated to be in excess of 3 pounds pull per linear inch of plate after ten minutes in an oven at 180° F.

EXAMPLE XIV

One liter of a transparent pretreatment dispersion in water was prepared containing 150 ml. of an ethoxylated tallow diamine with a mole ratio of ethylene oxide to hydrophobe of 15, to 1, 100 ml, toluene and 35 ml. of a monylphenoxypoly ethyleneoxy ethanol with a mole ratio of ethylene oxide to hydrophobe of 9 to 1. A rubber-modified polystyrene color chip was treated for two minutes in the dispersion at 70° F., rinsed for five minutes in 120° F. water and plated by the cycle described in Example XII. Adhesion as tested on a Platron Adhesion Testor, was 7 to 11 pounds pull per linear inch of plate after ten minutes in an oven at 180° F.

EXAMPLE XV

One liter of pretreat dispersion containing 180 ml. of an ethoxylated octyl phenol with a mole ratio of ethylene oxide to hydrophobe of 16 to 1, and 90 ml. of mixed xylene isomers containing a minor percentage of ethylbenzene was prepared. The dispersion was transparent and was not hazy. A rubber-modified polystyrene knob was treated in the solution for two minutes at 70° F. and rinse in 130° F. water prior to plating, as described in Example XII. The knob plated very well, and plate to plastic adhesion was estimated to be in excess of three pounds pull per linear inch of plate after 10 minutes in an oven at 180° F.

EXAMPLE XVI

A pretreat solution for preplating polystyrene resins was prepared by mixing 35 ml. of an alkylaryl polyether alcohol containing 9 moles of ethyleneoxide per mole of hydrophobe, 150 ml. of an ethoxylated tallow diamine having 15 moles of ethylene oxide per mole of hydrophobe and 100 ml. of toluene, diluting to 900 ml. with water while stirring. A 2 by 4½ inch color chip of rubber-modified polystyrene was immersed in the pretreat solution at 75° F. for two minutes and rinsed in 130° F. water for five minutes before treating in an oxidizing solution of sulfuric acid-water trivalent chromium compounds and saturated with hexavalent chromium compounds for ten minutes at 175° F. The density of the oxidizing solution was 45.3° F. Baumé. The color chip was then treated for thirty seconds in ten gallons of water containing 25 grams of Gafac RE610 at 75° F.

The color chip was next submerged in a colloidal palladium catalyst prepared as described in U.S. Pat. 3,011,920 by C. R. Shipley, Jr., at 90° F. for one minute. The color chip was then accelerated in a dilute palladium chloride solution for one minute prior to depositing electroless nickel on the chip from an ammoniacal nickel-hypophosphite type bath at 90° F. The color chip was completely covered with an adherent film of chemically deposited nickel alloy, but the plastisol coated plating rack supporting the color chip through the various steps of the process was free of the metal film. The color chip was electroplated with a film of sufficient thickness that the metal to plastic adhesion could be tested on a Platron Adhesion Testor and adhesion values of 5 to 9 pounds pull per linear inch of plate were recorded.

EXAMPLE XVII

A color chip of rubber-modified polystyrene was plated by the following cycle:

Pretreatment

Two minutes at 75° F. with stirring in a clear dispersion of 10 volume percent toluene, 3.5 volume percent nonylphenoxy poly (ethyleneoxy) ethanol containing nine moles of ethyleneoxide per mole of hydrophobe, fifteen volume per cent polyethoxylated tallow diamine containing fifteen moles of ethyleneoxide per mole of hydrophobe, and 71.5 volume percent water. The chip was then rinsed for five minutes in 130° F. water.

Oxidation

The chip was heated for ten minutes at 175° F. in a solution containing approximately 16 weight percent chromium trioxide, 35 weight percent concentrated sulfuric acid and 49 weight percent water after the solution had been concentrated to saturation with hexavalent chromium compounds. Density of the solution was approximately 1.45 g./cc. at 175° F.

Sensitization

Three minutes at 75° F. in a solution containing 50 p.p.m. Rohm & Haas XQS–7 phosphate ester and 2 weight percent Gafac RE610 phosphate ester.

Activation

Three minutes at 90° F. in a colloidal palladium catalyst prepared as in the U.S. Pat. 3,011,920 to C. R. Shipley, Jr.

Acceleration

One minute in a dilute solution of prechloric acid at 90° F. (see the said Shipley patent)

Electroless nickel

Seven minutes at 90° F. in an ammoniacal nickel-hypophosphite system at pH 9.

Electroplate

Nickel strike and sufficient bright acid copper to test for plate to plastic adhesion and then heated at 180° F. for five minutes. As is well known in the art rinses of water and acid were utilized in the plating cycle. The plate to plastic adhesion was 6 to 10 pounds pull per linear inch of plate. Surface appearance was decidedly improved over that obtained when the high sulfuric acid content oxidizer was used in the preplate cycle.

EXAMPLE XVIII

A color chip of rubber-modified polystyrene was plated by the cycle described in Example XVII with the exception of the oxidizer solution composition. The oxidizer composition changes and solution density at saturation increases with use; thus the solution in Example XVII was used until the density at saturation was approximately 1.50 to 1.51 g./cc. at 175° F. Plate to plastic adhesion was 5 to 11.5 pounds pull per linear inch of plate.

Alternatively, the prior examples may be repeated utilizing electroless plating of copper, cobalt, silver, arsenic, chromium, iron, gold, palladium and other metals known to be electrolessly platable in the plating art.

As thus described a metallic coating of electroless plate which may be followed by an electroplate or electroplatings may be applied to a molded polystyrene surface as a firmly-adhering plating. The invention provides as outstandingly novel steps the pretreatment with polystyrene or its modification products as defined above with a solvent carried in solution or dispersion or by contact with vapors containing a controlled quantity of solvent to be absorbed by the polymer. After drying or washing and etching, preferably with a saturated hexavalent chromium ion content-sulfuric acid solution, it is treated with a mineral acid ester of a polyethyleneoxy compound bonded to a hydrophobic radical which sensitizes the thus treated plastic to accept a catalytic quantity of nobel metal in a subsequent actuating step. Thereafter, the treated plastic may be electrolessly coated, which may be followed by electroplating. The plating is strongly adherent as illustrated in the plate adhesion tests in the examples mentioned which were performed with a commercial device known as a Platron Adhesion Testor which measures the adhesion strength of the plate as pounds of pull necessary to peel a one inch wide strip at one inch per minute with a load 90° from the surface.

The plating procedure given in the examples may be substituted by other electrolytic procedures, baths and specific techniques known in the electroplating or electroless plating art to produce a suitable plating. It will be understood that the temperatures, contact time of the molded plastic surface with the solvent, and the concentration of the solvent in the nonsolvent medium are variable to effect impregnation of the molded polystyrene surface to a quantity as stated, whereby its surface plating characteristics are sufficiently modified to accept a strongly adhered plate.

The process, moreover, is no limited to any particular shape or texture of the original polystyrene plastic. For instance, it can be conventional casting by extrusion or hot pressing into a mold, or through dies into various extruded shapes such as plates, rods, angle forms, and the like; it may be extruded thin sheets; or indeed, large complex castings including roto-molded large furniture items as is known in roto-casting. Moreover, the metal may be applied to beads or pellets from which beads have been compacted or extruded, and may include beads containing a foaming agent to form foamed bead products which have been expanded and cohered into large foamed shapes such as wallboard or the like. Thus the metal coating may be applied to the plastic as intermediate metal coated standard beads or pellets before forming into molded products, or the coating can be applied after the product has been molded and completed to desired solid or foamed plastic form.

Accordingly, various modifications will occur to those skilled in the art, and it is intended that the description and examples given herein be regarded as exemplary and not limiting except as defined in the claims as appended hereto.

What is claimed is:

1. The method of conditioning a solvent soluble surface of an article to accept a firmly adhered metal plating, said surface being made from material selected from the group consisting of styrene homopolymer, polystyrene impact containing 1–20% of rubber distributed therein, styrene copolymerized with acrylonitrile, said copolymer containing at least 40% of styrene, and styrene copolymerized with acrylonitrile having 1–20% of rubber distributed therein, the balance of said copolymer being acrylonitrile and said rubber, said method comprising contacting said surface with a treating fluid comprising a solvent for said surface maintained in the said fluid in a state of substantial dilution of 0.25 to 25 volume percent in a polar liquid substantial nonsolvent for said surface for a period of about 15 seconds to 30 minutes whereby said surface retains a controlled quantity of solvent from said fluid, by absorption of from 0.01 to 3.0 grams per square foot of said surface, said solvent being a member of the group consisting of aromatic hydrocarbon having 6 to 24 carbon atoms; alkanes and alkenes having 4 to 18 carbon atoms; alicyclics comprising cycloalkenes, terpenes and cycloalkanes having 5 to 24 carbon atoms; said hydrocarbon compounds further substituted with polar radicals selected from the group consisting of amino, hydrazino, oximino, sulfur-containing radicals, nitrile, alkoxy and halogen; and halogenated alkyls in which the halogen is a member of the group consisting of chlorine and fluorine, the alkyl having 1 to 12 carbon atoms, substituted with 1 to 4 of said halogen atoms; and then metal plating the solvent-treated surface.

2. The method of claim 1 wherein said treating fluid is a solution of said solvent dissolved in said nonsolvent for said polymer surface.

3. The method of claim 1 wherein said treating fluid comprises said solvent dispersed in the form of an emulsion within said substantial nonsolvent for said material.

4. The method of claim 3 wherein said substantial nonsolvent comprises water.

5. The method of claim 1 wherein said nonsolvent is a member of the group consisting of water, lower alkanols and alkanol ethers having 1 to 6 carbon atoms and 1 to 2 hydroxy groups, lower alkly ketones, di-lower alkyl formamide and di-lower alkyl sulfoxide, said lower alkyls having 1 to 2 carbon atoms and mixtures of said nonsolvents.

6. The method as defined in claim 5 wherein the nonsolvent is a mixture of water and another of said organic nonsolvents, the water being present in quantity to substantially reduce the solubility of said solvent surface material in said organic nonsolvent.

7. The method of claim 1 wherein said treating fluid is a vapor suspension of a solvent for said material in quantity of 0.25 to 25 volume percent of the total treating fluid body, the balance of said treating fluid body being gases which are substantially nonsolvent for said material at a temperature in the range of 70–200° F.

8. The method of claim 1 wherein the solvent is volatile aromatic hydrocarbon having 6 to 24 carbon atoms and is selected from the group consisting of benzene, toluene, o-, m- and p-xylenes, ethylbenzene, ethylstyrene, divinylbenzene, diethylbenzene, trimethylbenzene, triethylbenzene, tetramethylbenzene, styrene monomer, alpha methylstyrene, tetraethylbenzene and vinyl toluene.

9. The method of claim 1 wherein the solvent is an alicyclic compound having 5 to 15 carbon atoms selected from the group consisting of cyclopentane, cyclohexane, methylcyclohexane, cyclopentene, cyclohexene, methylcyclohexene, cyclopentadiene, dicyclopentadiene, dipentene, bornylene, alpha-pinene, p-methene, camphene, alpha-terpene, butylcyclohexane and diethylcyclohexane.

10. The method of claim 1 wherein said solvent hydrocarbons are natural hydrocarbon mixtures selected from the group consisting of petroleum naphthas having 4 to 10 carbon atoms, mixed aromatic distillates having 6 to 9 carbon atoms, terpene oils and mixed halogenated hydrocarbons having 1 to 3 carbon atoms.

11. The method of claim 6 wherein said treating fluid is a solution.

12. The method of claim 6 wherein said treating fluid comprises said solvent dispersed within said substantial nonsolvent for said material.

13. The method of claim 1 wherein said treating fluid is a liquid emulsion which is stabilized by a surface active agent.

14. The method of claim 1 wherein said substantial nonsolvent comprises water.

15. The method of claim 1 wherein said substantial nonsolvent further comprises an organic liquid which in the environment of said treating fluid is a nonsolvent for said plastic and which is miscible both in water and in the said solvent for the plastic.

16. The method of claim 1 wherein said surface active agent comprises a polyethoxylated compound having a hydrophobic group attached to a hydrophilic group which contains from 5–60 oxyethylene groups.

17. An article formed of a material selected from the group consisting of polystyrene homopolymer, polystyrene impact containing 1 to 20% of rubber distributed therein, styrene copolymerized with acrylonitrile, said copolymer containing at least 40% of styrene, and styrene copolymerized with acrylonitrile having 1 to 20% of rubber distributed therein, the balance of said copolymer being acrylonitrile and said rubber, said article having its surface first contacted with a treating fluid comprising a solvent for said surface maintained in the said fluid in a state of substantial dilution of 0.25 to 25 volume percent in a polar liquid substantial nonsolvent for said surface for a period of about 15 seconds to 30 minutes whereby said surface retains a controlled quantity of solvent from said fluid by absorption of from 0.01 to 3.0 grams per square foot of said surface, said solvent being a member of the group consisting of aromatic hydrocarbon having 6 to 24 carbon atoms; alkanes and alkenes having 4 to 18 carbon atoms; alicyclics comprising cycloalkenes, terpenes and cycloalkanes having 5 to 24 carbon atoms; said hydrocarbon compounds further substituted with polar radicals selected from the group consisting of amino, hydrazino, oximino, sulfur-containing radicals, nitriles, alkoxy and halogen; and halogenated alkyls in which the halogen is a member of the group consisting of chlorine and fluorine, the alkyl having 1 to 12 carbon atoms, substituted with 1 to 4 of said halogen atoms, said solvent-treated surface being finally plated with a metal.

18. The method of conditioning a solvent-soluble surface of an article to accept a firmly-adhered metal plating, said surface being made from material selected from the group consisting of styrene homopolymer, polystyrene impact containing 1 to 20% of rubber distributed therein, styrene copolymerized with acrylonitrile, said copolymer containing at least 40% of styrene, and styrene copolymerized with the acrylonitrile having 1 to 20% of rubber distributed therein, the balance of said copolymer being acrylonitrile and said rubber, said method comprising contacting said surface with a treating fluid comprising a solvent for said surface maintained in the said fluid in a state of substantial dilution of 0.25 to 25 volume percent in a substantial nonsolvent for said surface for a period of about 15 seconds to 30 minutes whereby said surface retains a controlled quantity of solvent from said fluid by absorption of from 0.01 to 3.0 grams per square foot of said surface, said solvent being a member of the group consisting of aromatic hydrocarbon having 6 to 24 carbon atoms; alkanes and alkenes having 4 to 18 carbon atoms; alicyclics comprising cycloalkenes, terpenes and cycloalkanes having 5 to 24 carbon atoms; said hydrocarbon compounds further substituted with polar radicals selected from the group consisting of amino, hydrazino, oximino, sulfur-containing radicals, nitrile, alkoxy and halogen; and halogenated alkyls in which the halogen is a member of the group consisting of chlorine and fluorine, the alkyl having 1 to 12 carbon atoms, substituted with 1 to 4 of said halogen atoms; oxidizing said solvent-treated surface by contact with a solution of sulfuric acid and hexavalent chromium ions in which said hexavalent chromium ions are maintained therein in a substantially saturated state, said hexavalent chromium being present in quantity such that the solution, when freshly prepared, contains no less than about 1¼ weight percent of hexavalent chromium, and then metal plating said surface.

19. The method of claim 18 wherein the said solution has a density less than 1.67 grams per cc.

20. The method of claim 18 further comprising sensitizing said oxidized surface with an organic or a multivalent mineral acid ester of a polyethoxylated compound having a hydrophobic group attached to a hydrophilic group which contains from 5–60 oxyethylene groups.

21. The method of claim 18 wherein said ester comprises a phosphoric acid ester.

22. The method of claim 20 wherein said ester comprises approximately 50 weight percent mono ester and 50 weight percent diester prepared by reacting nonylphenoxy (ethyleneoxy) ethanols containing an average of 8 moles of ethylene oxide per mole of hydrophobe with phosphoric acid.

23. The process of claim 20 wherein said sensitizing comprises contacting said surface with a solution containing said ester in concentration from 0.04–0.2 weight percent in said solution.

24. A method of selectively plating a solvent soluble plastic surface selected from the group consisting of styrene homopolymer, polystyrene impact containing 1 to 20% of rubber distributed therein, styrene copolymerized with acrylonitrile, said copolymer containing at least 40% of styrene, and styrene copolymerized with acrylonitrile having 1 to 20% of rubber distributed therein, the styrene being present in quantity of about 40 to 67%, the balance of said copolymer being acrylonitrile and said rubber, comprising in sequence:

(a) contacting said surface with a treating fluid comprising a solvent for said surface maintained in the said fluid in a state of substantial dilution of 0.25 to 25 volume percent in a substantial nonsolvent for said surface for a period of about 15 seconds to 30 minutes whereby said surface retains a controlled quantity of solvent from said fluid by absorption of from 0.01 to 3.0 grams per square foot of said surface, said solvent being a member of the group consisting of aromatic hydrocarbon having 6 to 24 carobn atoms; alkanes and alkenes having 4 to 18 carbon atoms; alicyclics comprising cycloalkenes, terpenes and cycloalkanes having 5 to 24 carbon atoms; said hydrocarbon compounds further substituted with polar radicals selected from the group consisting of amino, hydrazino, oximino, sulfur-containing radicals, nitrile, alkoxy and halogen; and halogenated alkyls in which the halogen is a member of the group consisting of chlorine and fluorine, the alkyl having 1 to 12 carbon atoms, substituted with 1 to 4 of said halogen atoms;

(b) oxidizing said surface by contact with a solution of sulfuric acid and hexavalent chromium ions in which said hexavalent chromium ions are maintained therein in a substantially saturated state; said hexavalent chromium being present in quantity such that the solution, when finally prepared, contains no less than 1¼ weight percent of hexavalent chromium;

(c) sensitizing said surface with an organic or multivalent mineral acid ester of a polyethoxylated compound having a hydrophobic group attached to hydrophilic group which contains from 5 to 60 oxyethylene groups;

(d) contacting said surface with a colloidal suspension of a noble metal to thereby activate the same by a deposition of noble metal particles thereon;

(e) selectively oxidizing said noble metal deposit to activate said deposit for the subsequent electroless deposition of metal;

(f) electrolessly plating the product of step (e).

25. The method of claim 24 wherein said treating fluid is a liquid dispersion which is stabilized by a surface active agent which comprises polyethoxylated compound having a hydrophobic group attached to a hydrophilic group which contains from 5–60 oxyethylene groups.

26. The method of claim 24 wherein said ester comprises approximately 50 weight percent mono ester and 50 weight percent diester prepared by reacting nonoylphenoxy (ethyleneoxy) ethanols containing an average of 9 moles of ethylene oxide per mole of hydrophobe with phosphoric acid.

27. The method of claim 26 wherein said article is carried sequentially through the steps of the process by a plastisol coated metal rack.

References Cited

UNITED STATES PATENTS

| | | |
|---|---|---|
| 2,209,940 | 7/1940 | Smith. |
| 3,132,983 | 5/1964 | Osborne et al. |
| 3,142,581 | 7/1964 | Leland. |
| 3,212,918 | 10/1965 | Tsu et al. |
| 3,235,426 | 2/1966 | Bruner. |
| 3,315,285 | 4/1967 | Farmer. |
| 3,438,798 | 4/1968 | Baudrand. |

FOREIGN PATENTS

| | | |
|---|---|---|
| 1,003,575 | 9/1965 | Great Britain. |

MURRAY KATZ, Primary Examiner

U.S. Cl. X.R.

117—138.8; 150—2; 204—30